… (Granted under Title 35, U. S. Code (1952), sec. 266)

The invention herein described may be manufactured and used by or for the Government of the United States of America for governmental purposes throughout the world without the payment to us of any royalty thereon.

This invention relates to and has as its prime object the provision of novel processes for preparing aromatic aldehydes.

Briefly described, our process involves the reaction of a halomethyl-substituted aromatic compound, that is, an aromatic methyl halide, with a metal salt of an organic hydroperoxide. By this reaction the halomethyl radical is converted into an aldehyde radical.

The preparation of benzaldehyde by the reaction of benzyl chloride with the potassium salt of tertiary butyl hydroperoxide may be demonstrated by the following equation. It is understood that this equation is given merely by way of illustration and the specific reagents mentioned may be replaced by other alternative reactants as hereinafter described.

$C_6H_5-CH_2Cl + (CH_3)_3COOK \rightarrow C_6H_5CHO + (CH_3)_3COH + KCl$

It is believed that benzyl tertiary butyl peroxide is formed as a primary reaction product but then decomposes forming benzaldehyde and tertiary butanol.

The process in accordance with this invention has many advantages. One of the foremost is that only the halomethyl radical is oxidized; if the aromatic radical contains other side chains such as methyl or other alkyl or substituted alkyl groups these remain intact. This of course is important in preparing aldehydes containing side chains such as mesitaldehyde. Previous methods of oxidation have not been capable of such directed and limited effect. Another advantage of our process is that the required halomethyl radical can readily be attached to an aromatic nucleus as by reaction of the aromatic compound with formaldehyde and hydrochloric or hydrobromic acid. By applying such halomethylation followed by application of our process one can prepare virtually any desired aldehyde. Another advantage of our process is that the by-products are easy to separate from the product. Thus in each case the hydroperoxide is converted into the corresponding alcohol (butyl alcohol in the case of butyl hydroperoxide, for example). This alcohol produced in the reaction acts as an additional solvent and can be readily separated from the product by distillation.

The following examples demonstrate the invention in greater detail. It is understood that these examples are furnished only by way of illustration and not limitation.

Example I

Sixteen and nine-tenths grams (0.1 mole) of chloromethylmesitylene (also known as 2,4,6-trimethyl-benzyl chloride) was dissolved in 100 ml. methyl alcohol to which was then added 12.8 grams (0.1 mole) of the potassium salt of tertiary butyl hydroperoxide. The mixture was refluxed for 5 hours. The reaction mixture was then subjected to distillation whereby the product mesitaldehyde (also known as 2,4,6-trimethyl-benzaldehyde) was obtained in a yield of 58%, boiling point 109° C. at 24 mm. Hg.

Example II

The process of Example I was repeated substituting for the chloromethylmesitylene stoichiometrical equivalent quantities of other chloromethylated compounds. In each case the solvent was methanol. The conditions, reagents, products, etc. obtained are summarized in the following table:

| Chloromethyl reactant used | Temperature of reaction | Time of reaction, hrs. | Product | Yield, percent |
|---|---|---|---|---|
| benzyl chloride | reflux | 8 | benzaldehyde | 23 |
| p-nitro benzyl chloride | do | 3 | p-nitrobenzaldehyde | 32 |
| o-chlorobenzyl chloride | 40° C | 1 | o-chlorobenzaldehyde | 74 |
| 2-chloromethyltetralin [1] | reflux | 5 | tetralin-2-aldehyde [2] | 56 |

[1] Also known as 2-chloromethyl-5,6,7,8-tetrahydronaphthalene.
[2] Also known as 5,6,7,8-tetrahydronaphthaldehyde-2.

The process of this invention is of wide versatility and can be used to prepare many aromatic aldehydes. In any case the starting material must contain an aromatic nucleus having attached thereto a halomethyl radical, this latter radical being converted by our process into the aldehyde group. The aromatic nucleus, which may be that of benzene, naphthalene, anthracene, phenanthrene, fluorene, pyrene, etc., may contain in addition to the halomethyl radical one or more radicals which are inert in the reaction. Inert radicals may be for example, dialkyl amine, carboxy, aldehyde, ketone, aryl, alkyl, cycloalkyl, nitro, hydroxyalkyl, sulphonic acid, carboxyalkyl, halide, hydrogen, and so forth.

As the hydroperoxide reactant we prefer to use an alkali metal salt of tertiary butyl hydroperoxide. However, one may employ other reactants of this type, for example, the hydroperoxides of ethyl, propyl, isopropyl, n-butyl, isobutyl, sec-butyl, cyclohexyl, and so forth. In any case the hydroperoxide should be employed in the form of its salt with a metal, preferably an alkali metal such as sodium or potassium.

In general, the aromatic methyl halide and the hydroperoxide are employed in about equimolecular proportions. Obviously, if the aromatic reactant contains two chloromethyl radicals, then the reactants would be employed in a proportion of 1 mol of the aromatic compound to 2 moles of the hydroperoxide thus to produce the dialdehyde.

An inert solvent is usually employed to obtain good contact between the reactants. In general the alcohols are preferred for this purpose and thus we may use methanol, propanol, any of the butanols or pentanols, cyclohexanol, tetrahydrofurfural, and so forth.

The reaction usually requires heating and in most cases it is most convenient to reflux the mixture to complete the reaction. In such case of course the temperature will be essentially that of the solvent selected. In general temperatures in the range from about 25° C. to about 100° C. may be employed.

In this description we have illustrated the use of a chloromethyl radical as the radical which is converted to the aldehyde group. Actually the presence of chlorine is not essential and the process will be operative with any other reactive halogen (bromine or iodine) in place of the chlorine.

Having thus described our invention, we claim:

1. A process for preparing aromatic aldehydes which comprises reacting at a temperature from about 25° C. to about 100° C. an aromatic methyl halide with an alkali metal salt of an organic hydroperoxide.

2. A process for preparing mesitaldehyde which comprises reacting at a temperature from about 25° C. to about 100° C. chloromethylmesitylene with an alkali metal salt of tert. butyl hydroperoxide.

3. A process for preparing benzaldehyde which comprises reacting at a temperature from about 25° C. to about 100° C. benzyl chloride with an alkali metal salt of tert. butyl hydroperoxide.

4. A process for preparing tetralin-2-aldehyde which comprises reacting at a temperature from about 25° C. to about 100° C. 2-chloromethyltetralin with an alkali metal salt of butyl hydroperoxide.

5. A process for preparing p-nitrobenzaldehyde which comprises reacting at a temperature from about 25° C. to about 100° C. p-nitrobenzyl chloride with an alkali metal salt of tert. butyl hydroperoxide.

6. A process for preparing o-chlorobenzaldehyde which comprises reacting at a temperature from about 25° C. to about 100° C. o-chlorobenzyl chloride with an alkali metal salt of tert. butyl hydroperoxide.

TOD W. CAMPBELL.
GALVIN M. COPPINGER.

REFERENCES CITED

The following references are of record in the file of this patent:

UNITED STATES PATENTS

| Number | Name | Date |
|---|---|---|
| 1,272,522 | Putnam | July 16, 1918 |
| 1,908,918 | Reddelien et al. | May 16, 1933 |
| 2,508,256 | Harman | May 16, 1950 |
| 2,548,435 | Lorand et al. | Apr. 10, 1951 |